UNITED STATES PATENT OFFICE 2,579,995

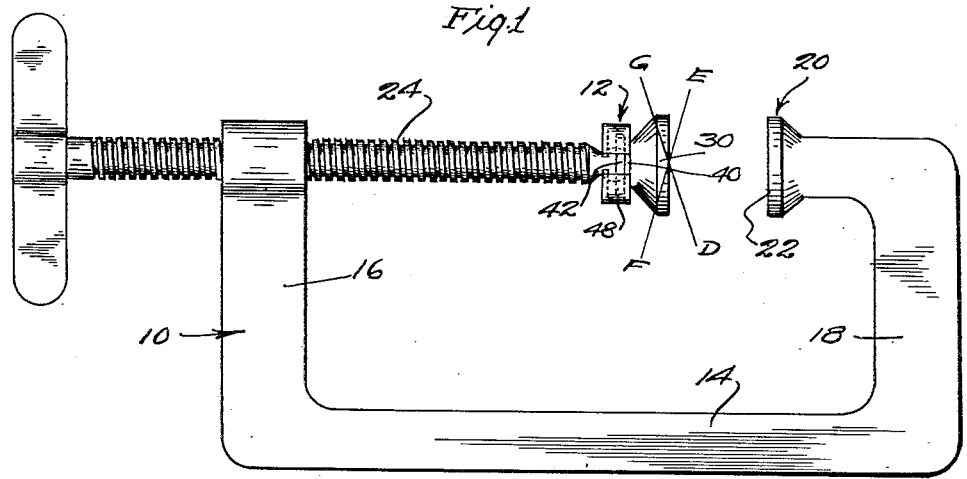
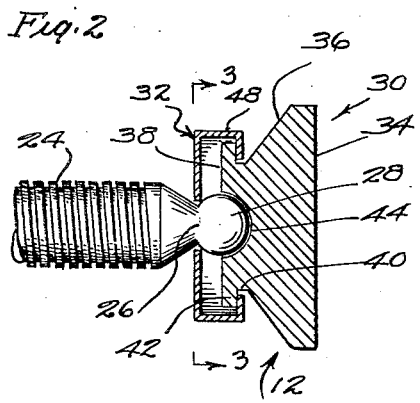
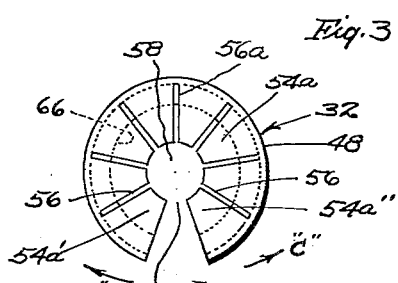
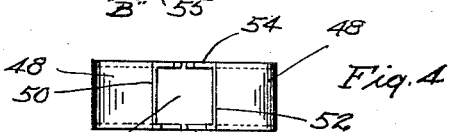
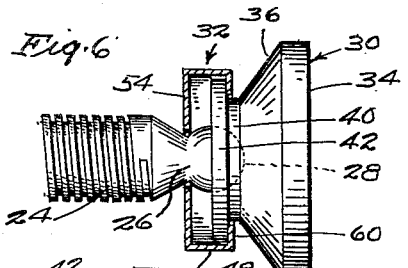
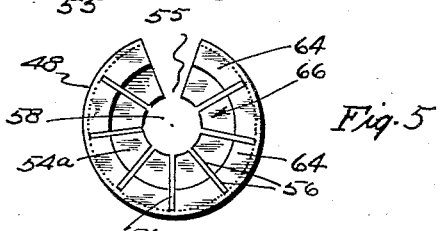
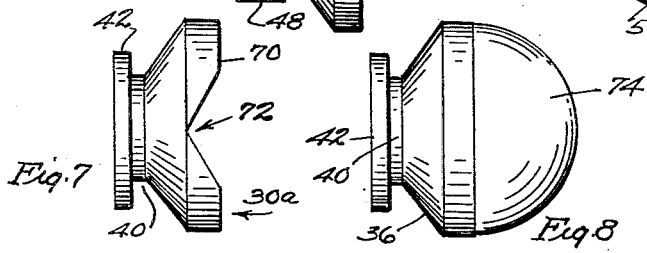
INVENTOR.
Elmer E. Atchison

SEPARABLE PRESSURE PAD ATTACHMENT FOR C-CLAMPS

Elmer E. Atchison, Pomona, Calif.

Application September 2, 1948, Serial No. 47,357

1 Claim. (Cl. 144—304)

The present invention relates to clamps in general, but is particularly directed to the so-called "C-clamp," in which a fixed pad and a screw operated pad or tip are adapted to relative movement along a longitudinal line extending across the arms of the clamp structure and which pad and tip are adapted to apply pressure upon opposite sides of a piece of work as a means of holding the work stationary or in union with other work.

The tip of a C-clamp is formed with a semispherical recess having an annular flange extending outwardly therefrom, and which recess is adapted to receive the spherical end of a screw threaded through one of the arms of the clamp structure, after which the annular flange of the tip is rolled or otherwise caused to loosely encircle a shank joining the spherical tip of the screw and the body thereof, so that when united, the tip is free for self-accommodation of position when functionally applied to work. Because of imposed stress, because of normal wear and for other cause, the adjustable tips of C-clamps do become detached from screw and when detached the C-clamp as a whole becomes useless and must be replaced in its entirety, even though but one element thereof is faulty and this condition arises from and is attributable entirely to past methods of construction of this type of tool.

In contra-distinction to this past and even presently used form of construction, it is the prime object of this invention to provide and the following specification to disclose a novel arrangement wherein the adjustable tip of a C-clamp is held in detachable relationship to the remainder of the clamp construction, to the end that worn tips may be easily and readily replaced with a new one, or tips having particular configurations adapted to special work may be substituted in lieu of another type of tip to meet a particular requirement.

An advantage of the present invention flows from the lowering of costs of this type of clamp construction for the screw of the clamp is not processed after being threaded through its supporting arm to bring the tip into union therewith, but on the contrary such union is effected by a simple and easily accomplished manual assembly at the point of manufacture, or may with equal facility be accomplished by the workman upon his job.

A further advantage and a feature of the improvement resides in the fact that a standard C-clamp may now be used to bring cylindrical and other shaped work objects into firm contact by use of special C-clamp tips in contra-distinction to present practice which is limited to the employment of plane surfaced tips operating in conjunction with plane surfaced pads, which practice limits the use of C-clamps to plane surfaced work.

With the foregoing object, features and advantages of the invention in mind, others thereof may be noted from the accompanying drawing, the detailed description and claim.

In the drawing:

Figure 1 is a side-elevational view showing a conventional type of C-clamp provided and fitted with the improvement of this invention whereby the tip thereof is held in detachable and replaceable relationship to the body thereof.

Figure 2 is a sectional view through the detachable tip and associated collet, the latter element being adapted to hold the tip in functional position upon a screw, a fragment of which is shown.

Figure 3 is a top-plan view of the collet above referred to; and,

Figure 4 is a side-elevational view thereof; while,

Figure 5 is a bottom-plan view thereof.

Figure 6 is a view analogous to Figure 2 excepting that the tip is here shown in side-elevation.

Figure 7 is a side view of a modified form of tip adapted to special use, which may be substituted for the conventional plane surfaced tip shown in Figure 1; while, Figure 8 is a view showing a still further modified form of tip adapted to specialized work, this view and Figure 7 are merely illustrative of the increased scope and adaptability of the improvement to a variety of forms of work which heretofore required individually constructed C-clamps in the performance thereof, other specialized tips may be used in conjunction with the improvement of this with equal facility to those shown.

In the drawing the reference character 10 indicates a conventional C-clamp modified to the extent only of incorporation of the improvement constituting the present invention as indicated at 12.

The C-clamp 10 comprises a body portion 14 having arms 16 and 18 extending at substantially right angles to the body and being in substantially the same horizontal plane. The arm 18 is provided with a pad or anvil 20 the work surface 22 of which is a plane which is medially aligned with and at right angles to the medial center of a manually operated screw 24 positioned in and adjustable within the arm 16. C-clamps are usually provided with threads having a heavy pitch to enable rapid advance of the screw to and from its work and these threads terminate adjacent a constriction or neck 26 having a spherical end portion 28 of a smaller diameter than the diameter of the stock of which the screw 24 is formed whereby the part 24 is easily and quickly screwed through the arm 16 for use.

The improvement 12 comprises a tip 30 of such form and construction as to be detachably and replaceable upon the spherical portion 28 by means of a collet 32.

As shown in the drawing the tip 30 is formed with a body portion having a flat or plane surface 34, and the sides 36 of which are inclined toward the face 38, and which terminate in an annular groove 40 bounded upon its opposite side by an annular flange 42, the one face of which is coincident with the face 38 of the tip. A semispherical recess 44 is formed in the face 38 and the medial transverse center of the tip and is adapted to receive the spherical portion 28 socketed therein.

The collet 32 is formed of springable sheet metal and as shown in Figures 3, 4 and 5, is formed with circularly directed sides 48 which terminate at their ends 50 and 52 in spaced relationship to one another. The top-side of the collet is formed with an inwardly directed flange 54 which is slotted by means of a plural number of slits 56 extending from a central opening 58 to the sides 48 whereby the flange 54 is divided into a plural number of segments 54a which serve the purpose of fingers in supporting the collet around the neck 26 of the screw 24. The opposite face of the collet is also formed with a flange, that is, with flange 60 which is divided by means of slits 62 into a plural number of segments or fingers 64 in identical manner to the afore-described fingers 54a modified to the extent that the opening 66 or space between the ends of diametrically opposed fingers 64 is greater than the diameter of the opening 58 for the reason that the flange 60 is adapted to be positioned within the annular recess 40 as shown in the several figures of the drawing.

Since the essence of this invention resides in the creation of replaceable tips for a C-clamp, this consideration in itself leads to the creation of tips of various form and contour of work surface adapted to be used in those instances of use when a tip having a flat work surface is not of best advantage, and to this end I have shown variations of the conventional tip work surface for specialized work. In Figure 7 the work surface 70 of the tip 30a is provided with a V-shaped groove 72 whereby the tip when placed upon the screw 24 of the clamp may be used to secure a cylindrical shape in position for such use as may be intended, in other respects the form of the tip 30a follows the previous description of the tip 30. In Figure 8 a further modified form of tip is shown and which construction is advantageous when clamping concaved material upon or in proximity with other material. These variations of tip construction are illustrative of adaptability to a wide range of uses to which a C-clamp may now be put in contra-distinction to the limited use to which this form of clamp has heretofore been satisfactory.

The following is a description of operation:

To change the work tip 30, or modifications thereof, for any reason whatsoever, it is only necessary to spring the sides 48 of the collet laterally, as indicated by the arrows "B and C," whereby the gap 55 between the fingers 54a' and 54a" is enlarged sufficiently to permit the neck 26 of the spherical portion 28 to pass therethrough so that the collet and tip are released therefrom, or the collet may be left in position upon the neck 26 and the flange 42 of the tip may be withdrawn from within the collet, which in either case is spread apart as mentioned, and in connection with which the bending point of the collet is located very nearly at a point coincidental with the outer end of the slit 56a and in the side 48. A new tip is placed in work position by mere reversal of the steps involved in removal thereof, and a replaced tip may comprise or be a duplicate of the one just removed or it may be a variation thereof analogous to the showing in Figures 7 and 8, to meet a particular situation.

The relationship between the tip, the collet and the spherical portion 28 of the screw 24 is such with respect to freedom of movement as to enable the work surface of the tip to be directed at an angle, see lines E—F, G—D, to the work within the limits of tolerance permissible in the use of C-clamps, which fact when taken into consideration with adaptability to change the tip from an old one to a new one, or from one having a given work surface to one having a different form of work surface, is believed to be conclusive of novelty not heretofore found in C-clamp construction.

Having thus described my invention in its preferred form, that which I believe to be novel and for which Letters Patent are sought, is as follows:

In a C-clamp having a screw formed with a spherical end-portion, a tip adapted to cooperative action with said screw, said tip being formed with opposite and parallel faces, one of said faces being a work surface, the other of said faces being formed with a semi-spherical recess adapted to be socketed with the spherical end-portion of said screw, an annular groove in said tip, and a collet, said collet being formed of a resilient circular band having upper and lower segmented flanges of unequal width, the segments of one of said flanges being adapted to be nested in the annular groove in said tip and the segments of the other of said flanges being adapted to engage the spherical end-portion of said screw whereby said tip is held in springable detachable relationship with respect to the screw.

ELMER E. ATCHISON.

REFERENCES CITED

The following references are of record in the file of this patent:

UNITED STATES PATENTS

| Number | Name | Date |
| --- | --- | --- |
| 260,510 | Watteyne | July 4, 1882 |
| 310,870 | Blessing (1) | Jan. 20, 1885 |
| 315,464 | Blessing (2) | Apr. 14, 1885 |
| 775,399 | Halladay | Nov. 22, 1904 |
| 1,403,580 | Venema | Jan. 17, 1922 |
| 1,498,638 | Periolat | June 24, 1924 |
| 2,156,195 | Robillard | Apr. 25, 1939 |